Nov. 11, 1958    J. R. WALD, JR., ET AL    2,859,560
MANUFACTURE OF SPHERICAL PARTICLES
Filed Oct. 2, 1956                          2 Sheets-Sheet 1
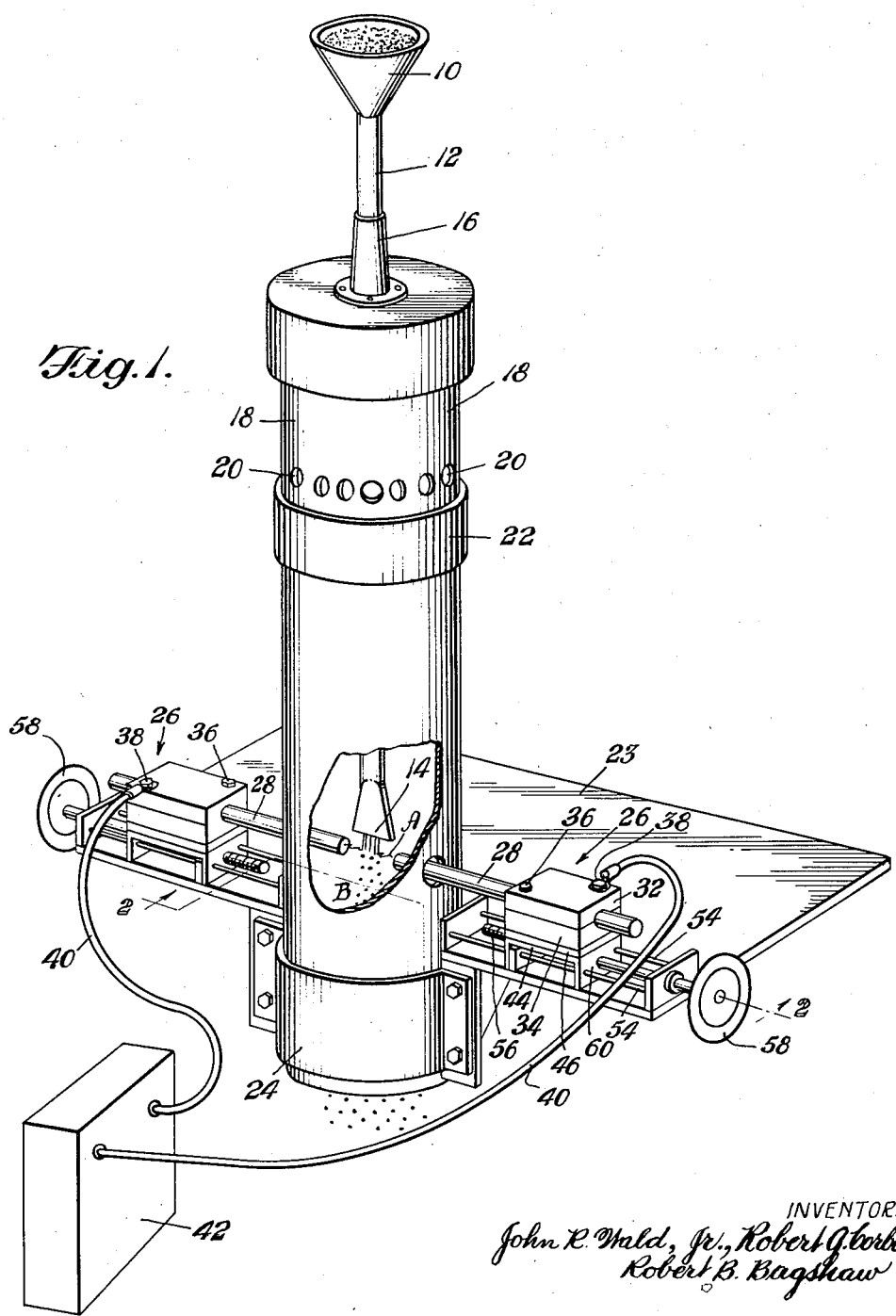
INVENTORS
John R. Wald, Jr., Robert G. Corbin
Robert B. Bagshaw
BY Karl W. Flocks
ATTORNEY

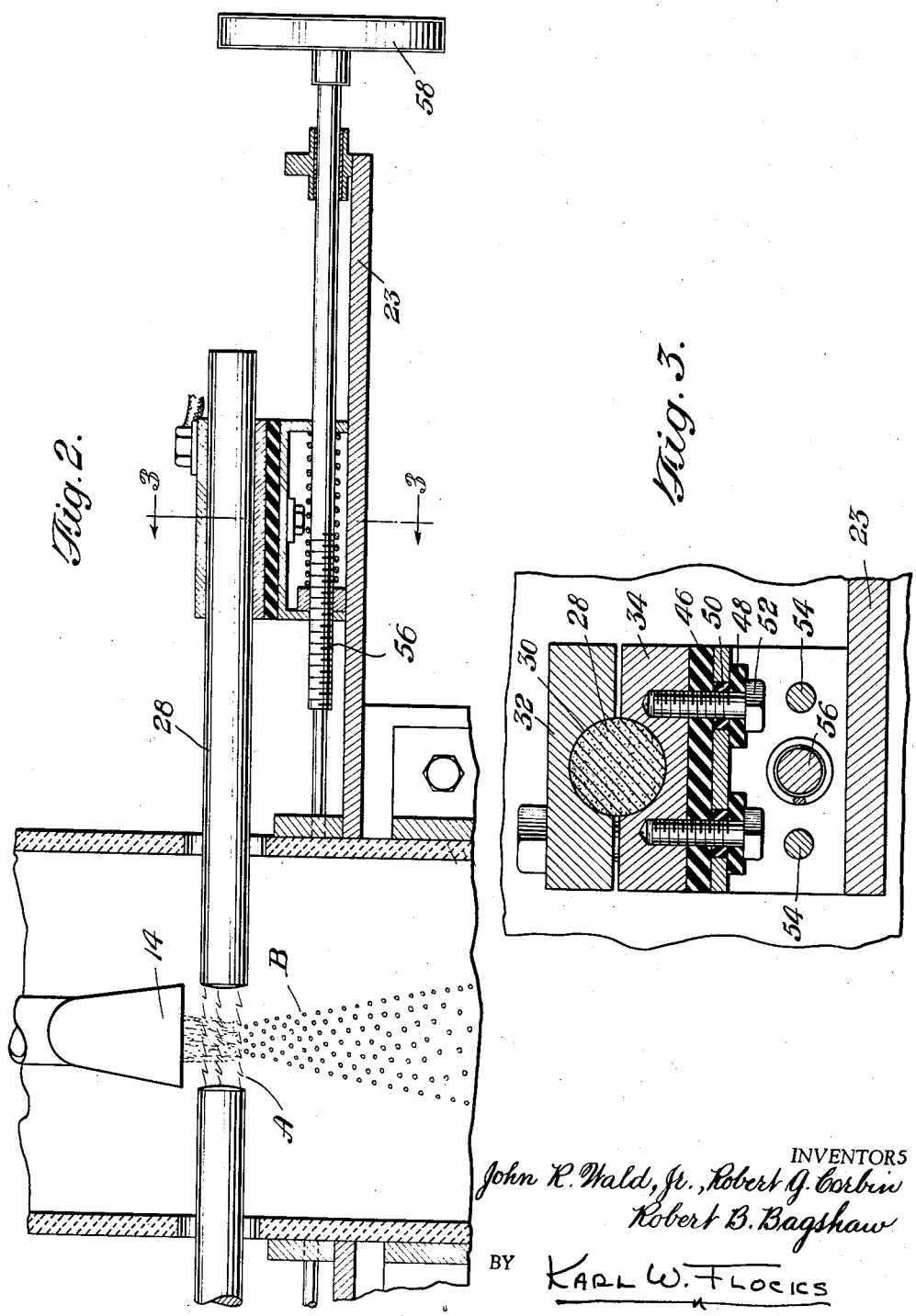

United States Patent Office 2,859,560
Patented Nov. 11, 1958

2,859,560

MANUFACTURE OF SPHERICAL PARTICLES

John R. Wald, Jr., Robert G. Corbin, and Robert B. Bagshaw, Huntingdon, Pa., assignors to Wald Industries, Inc., Huntingdon, Pa., a corporation of Pennsylvania Application October 2, 1956, Serial No. 613,538

9 Claims. (Cl. 49—58)

This invention relates to the manufacture of beads, and more particularly to a method and apparatus for the manufacture of small spherical glass beads.

The present invention is particularly applicable to the production of small glass beads useful in the manufacture of reflecting motion picture screens, reflecting road signs and markers, reflecting advertising signs, and in reflecting highway marking paint. In such usage, it is the practice to embed glass spheres of small diameter in a suitable binder so that the spheres, backed by the binder material, act as reflectors for light projected thereagainst. It is desirable that the glass beads be substantially spherical, as in most cases irregular and non-spherical beads or broken glass particles would cause diffraction of the light rays to such an extent as to partially destroy the reflecting effect from the device.

The production of small diameter glass beads of substantially uniform size and substantially true spheres, however, presents pronounced manufacturing difficulties. It has long been known that a molten material, such as glass or a metal, when dropped from a height, will take on a spherical shape. This fact has been made use of in the manufacture of large sizes of glass beads. When, however, attempts are made to drop molten glass in sufficiently small droplets to produce small diameter beads, the results are unsatisfactory because it is difficult to get a droplet of uniform size and small enough to produce such small diameter beads, and in many instances such particles adhere together and produce small clusters instead of beads.

It heretofore also has been proposed to prepare glass beads by subjecting pulverized glass to the influence of heat while in motion by dropping the pulverized glass, in a stream, into the path of a more or less horizontal jet of burning gas to fuse the individual particles of powdered glass. The resulting product contained some spherically shaped particles, but also contained substantial amounts of irregularly shaped particles, and of aggregated particles, superficially fused together. In cases where regularity of shape and uniformity of size of the resulting particles is an important consideration, such products are objectionable, since the task of separating the irregularly shaped from the regularly shaped particles is not commercially feasible.

Another fundamental disadvantage of the heretofore used processes is in their extremely low thermal efficiency. In introducing a stream of finely divided particles into the flame, one tends to extinguish combustion in the immediate vicinity of the point of introduction, with the result that spherulization cannot take place until the stream of particles has been swept along to admit of reignition of the gases enveloping the particles. In such circumstances, it is unavoidable that an appreciable portion of the particles never becomes subjected to spherulizing temperature before passing out of the zone of influence of the flame. But, even if the particles dropped into the flame do not absorb heat therefrom at such a rate as to extinguish combustion, the rate and amount of heat absorption may well be sufficient to prevent a temperature rise sufficient actually to fuse and spherulize the suspended particles with the result that complete spherulization will not take place although the combustion is complete.

It is an object of the present invention to provide an improved process and apparatus for spherulizing small glass particles which eliminates the difficulties heretofore mentioned.

It is a further object of the present invention to produce spherical glass beads of nearly uniform diameter from small glass particles in a single operation using an improved simple form of apparatus.

It is a still further object of the present invention to produce an improved process and apparatus for spherulizing small glass particles wherein the particles are instantaneously fused and immediately solidified.

Further objects and advantages of the invention will be apparent from the preferred form of the invention which is illustrated in the accompanying drawings, in which:

Fig. 1 is a perspective view partly broken away showing the apparatus in operation;

Fig. 2 is an enlarged cross-sectional view taken along the line 2—2 of Fig. 1; and Fig. 3 is a similar cross-sectional view taken along the line 3—3 of Fig. 2.

Essentially, the present invention relates to a process and apparatus wherein small particles of glass are permitted to fall through an electric arc wherein the glass particles are instantly heated and become molten, forming minute glass globules which are solidified instantly into perfect spheres as they leave the heat zone.

The apparatus consists of a hopper or funnel 10 attached to one end of a length of tubing 12, preferably made of heat resisting stainless steel. The opposite end of the tubing is flattened as at 14 to form a narrow discharge slot located immediately above the heat zone to be described. A split collar 16 or other suitable arrangement is provided for adjusting the vertical position of the tubing 12 and holding it in operating poistion. A non-metallic non-inflammable flue pipe 18 surrounds the tubing 12 and is provided with a plurality of vents or ports 20 for the escape of combustion gases. A sliding sheet metal shroud 22 in the form of a sleeve surrounds the flue pipe 18 and may be vertically adjusted to regulate the effective area of the ports 20.

The flue pipe 18 is secured to a base plate 23 by means of a clamping band 24. The base plate 23 likewise supports a pair of electrode carriers 26 which will now be described in detail. The electrode carriers 26 are utilized to support carbon electrodes 28 in an opening 30 formed between a pair of plates 32 and 34. The plates are secured together to retain the electrode 28 by means of cap screws 36 and 38. It should be noted that the cap screws 38 also provide the terminals for cables 40 which lead from a suitable regulated power supply 42. The carrier plates 32 and 34 are insulated from the channel-shaped bases 44 by insulating pads 46, insulating washers 48 and insulated bushings 50. The washers 48 and bushings 50 surround the threaded bolts 52 which retain the assembly together as best shown in Fig. 3.

A pair of guide rods 54 support the electrode carriers, and horizontal adjustment thereof is provided by threaded rods 56 to which are attached hand wheels 58 for ease of adjustment. The electrode carriers 26 are spring loaded so that the electrodes 28 can be brought into contact with each other to strike or initiate the arc A without changing the original spacing of the electrode tips. The flange portions 60 of the channel-shaped bases 44 are provided with aligned openings to receive the rods 54 and 56.

In operation, small glass particles are poured into the hopper or funnel 10. These particles fall downwardly through the tubing 12 and through the narrow slot at 14 directly into the arc formed between the carbon electrodes 28. Gases of combustion from the electrodes 28 are conducted upwardly in the flue pipe 18 surrounding the tubing 12 and escape through the vent openings 20. In passing upwardly, the heat contained in these gases is absorbed by the glass particles passing downwardly through the tubing 12, thereby preheating the particles. The arc A formed between the electrodes can be controlled by the distance between the electrodes as well as by voltage and current regulation. The position of the electrodes 28 can be adjusted by rotating the hand wheels 58, thus rotating the threaded rods 56 and advancing or retracting the electrode carriers 26 along the guide rods 54.

The glass particles in falling through the slot at 14 into the electric arc A are immediately melted and assume a spherical shape, and when they pass out of the arc A, quickly solidify during further free fall to produce glass beads which are absolutely smooth and spherical. The solidified spherical particles are caught at the bottom of the apparatus in a suitable receiver, not shown.

Since the flow of heat is maintained upwardly, the zone immediately below the arc A is maintained cool, and results in the immediate solidification of the spheres without aggregation. If desired, cold gas can be passed upwardly from the lower end of the apparatus to maintain the cooling zone B, at the proper temperature to insure immediate solidification of the spheres.

An alternate means of quickly solidifying the molten glass spheres is to catch them at the bottom of the apparatus in a water bath.

The entire process can be conducted continuously in a simple manner by continuously or periodically charging the glass particles at the top and removing the finished product at the bottom. It should be understood that suitable valve means can be provided other than the slot at 14 to maintain the proper rate of flow of the particles or to stop it entirely. Also, the number of electrodes can be varied as desired, and the number of arcs can be varied to obtain the same end result.

The above-described process and apparatus represents a novel manner of treating small glass or metal particles or the like and enables the simple and cheap production of small spheres. It is evident that the process according to the invention can be applied to any fusible pulverous material of irregular particle shape such as metal oxide, ceramic substances, carbon, silicates, clays, and the like, as well as glass and metal.

The process described heretofore can be used to produce spheres with diameters as small as 3 mils.

Among the advantages of this invention are the fact that the size of the furnace utilized can be greatly reduced from that conventionally used for this purpose and secondly, the loss of spheres passing up the flue of the present gas-fired furnace can be reduced to a minimum.

It will be obvious to those skilled in the art that various changes may be made without departing from the spirit of the invention and therefore the invention is not limited to what is shown in the drawings and described in the specification but only as indicated in the appended claims.

What is claimed is:

1. A process for changing discrete powdered glass particles of irregular shape into glass particles of smooth spherical shape consisting in dropping said irregularly shaped particles through an electric arc wherein said particles become molten, and allowing said molten particles to solidify while continuing to drop through a gaseous atmosphere.

2. A process in accordance with claim 1, wherein said particles are preheated prior to reaching said electric arc to a temperature below the softening point of said particles.

3. A process for changing discrete powdered glass particles of irregular shape into glass particles of smooth spherical shape consisting in dropping said irregularly shaped particles through an electric arc wherein said particles become molten, and allowing said molten particles to solidify immediately after leaving said arc in a cooling zone located immediately below said arc while continuing to drop through a gaseous atmosphere.

4. A process in accordance with claim 3 wherein said particles are preheated prior to reaching said electric arc to a temperature below the softening point of said particles.

5. A process in accordance with claim 4, wherein the combustion gases rising from said arc are utilized for preheating said particles.

6. Apparatus for changing discrete powdered glass particles of irregular shape into glass particles of smooth spherical shape comprising a vertical tube adapted to receive said particles at its upper end, said tube being flattened at its lower end to form a narrow elongated discharge slot, means for feeding glass particles into the upper end of said tube, a pair of separated carbon electrodes located below said slot in such a manner that the discharge from said slot passes between said electrodes, means for supplying voltage to said electrodes whereby an arc is formed therebetween, said arc being located immediately below said discharge slot, a cooling zone located immediately below said electrodes, whereby said falling particles are melted into spherical form while passing through said arc and solidify in said cooling zone into small individual spheres.

7. In apparatus in accordance with claim 6, wherein a flue pipe encloses said vertical tube, the inner ends of said electrodes and said cooling zone, whereby the products from combustion of said electrodes rise in said flue pipe around said vertical tube.

8. In apparatus in accordance with claim 7, wherein said flue pipe is closed at the upper end and open at the lower end thereof, said vertical tube passing upwardly through said upper closure, and a plurality of ports located in said flue pipe adjacent the upper end thereof for discharging said products of combustion.

9. In apparatus in accordance with claim 8, wherein means are provided for varying the area of said ports.

References Cited in the file of this patent

UNITED STATES PATENTS

| | | |
|---|---|---|
| 1,443,816 | Fitzgerald | Jan. 30, 1923 |
| 2,038,251 | Vogt | Apr. 21, 1936 |
| 2,189,387 | Wissler | Feb. 6, 1940 |
| 2,261,425 | Wentworth | Nov. 4, 1941 |
| 2,405,403 | Chronis | Aug. 6, 1946 |
| 2,538,603 | Thys | Jan. 16, 1951 |